(12) United States Patent
Gao et al.

(10) Patent No.: US 10,083,263 B2
(45) Date of Patent: Sep. 25, 2018

(54) AUTOMATIC MODELING FARMER

(71) Applicant: FAIR ISAAC CORPORATION, Roseville, MN (US)

(72) Inventors: Lu Gao, American Canyon, CA (US); Brendan Alexander Lacounte, Pacifica, CA (US); Jane Sherman, San Rafael, CA (US); Radha Chandra, Berkeley, CA (US); Erik Franco, Napa, CA (US); Ethan J. Dornhelm, San Rafael, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 0 days.

(21) Appl. No.: 15/722,143

(22) Filed: Oct. 2, 2017

(65) Prior Publication Data

US 2018/0025104 A1    Jan. 25, 2018

Related U.S. Application Data

(63) Continuation of application No. 14/468,724, filed on Aug. 26, 2014, now Pat. No. 9,779,187.

(60) Provisional application No. 61/869,959, filed on Aug. 26, 2013.

(51) Int. Cl.
*G06F 17/50* (2006.01)

(52) U.S. Cl.
CPC ................ *G06F 17/5009* (2013.01)

(58) Field of Classification Search
CPC .................... G06Q 40/08; G06F 17/5009
USPC .................................... 703/6; 705/4
See application file for complete search history.

(56) References Cited

U.S. PATENT DOCUMENTS

| 8,200,511 | B2 | 6/2012 | Zizzamia et al. |
| 9,367,520 | B2 | 6/2016 | Zhao et al. |
| 2012/0316981 | A1 | 12/2012 | Hoover et al. |
| 2014/0365356 | A1 | 12/2014 | Gao et al. |

*Primary Examiner* — Andy Ho
(74) *Attorney, Agent, or Firm* — Mintz Levin Cohn Ferris Glovsky and Popeo, P.C.

(57) ABSTRACT

Data can be accessed from a plurality of disparate data sources from at least one database. A plurality of test models can be automatically built by a model building engine. Each test model can have predetermined predictive variables. A final set of predictive variables can be determined by a variable selector from the predetermined predictive variables in the plurality of test models by comparing the predictive power of the predictive variables across the plurality of test models. A master dataset can be generated from the disparate data sources. A master model can be built from the master dataset. The master model can combine the final set of predictive variables from the plurality of disparate data sources. The master model can characterize a quantitative estimate of the probability that an entity will display a defined behavior. Related apparatus, systems, techniques, and articles are also described.

20 Claims, 4 Drawing Sheets

AUTOMATIC MODELING FARMER

CROSS-REFERENCE TO RELATED APPLICATION

This application is a continuation of and claims priority under 35 U.S.C. § 120 to U.S. patent application Ser. No. 14/468,724, filed Aug. 26, 2014, and granted as U.S. Pat. No. 9,779,187, which claims priority under 35 U.S.C. § 119(e) to U.S. Provisional Patent Application No. 61/869,959, filed Aug. 26, 2013, the entire disclosures of which are hereby expressly incorporated by reference herein.

TECHNICAL FIELD

The subject matter described herein relates to an automatic modeling farmer that allows a streamlined modeling process to enable quick development of large-scaled models using big data.

BACKGROUND

Big data is the term for a collection of data sets so large and complex that it becomes difficult to process using on-hand database management tools or traditional data processing applications. Big data is high volume, high velocity, and/or high variety information assets that require new forms of processing to enable enhanced decision making, insight discovery, process optimization, and the like. The trend to larger data sets is due to the increasing abundance of information, both being recorded and derivable from analysis of large sets of related data.

Scorecards are mathematical models that attempt to provide a quantitative estimate of the probability that a consumer will display a defined behavior (e.g., accept another product if offered one, loan default, bankruptcy or a lower level of delinquency). Scorecards are built and optimized to evaluate the credit file of a homogeneous population (e.g. files with delinquencies, files that are very young, files that have very little information). Many traditional empirically derived scoring systems have between 10 and 20 variables.

A widespread use of scorecards is for credit scoring. Credit scoring typically uses observations or data from individuals who defaulted on their loans plus observations on a large number of consumers who have not defaulted. Statistically, estimation techniques such as logistic regression or probit are used to create estimates of the probability of default for observations based on this historical data, although other techniques can be used. The credit score model can be used to predict probability of default for new individuals using the same observation characteristics or variables (e.g., age, income, house owner). The default probabilities are then scaled to a "credit score." This score ranks individuals by riskiness without explicitly identifying their probability of default.

SUMMARY

In an aspect, data can be accessed from a plurality of disparate data sources using at least one data processor and from at least one database. A plurality of test models can be automatically built by a model building engine using at least one data processor. The data can be obtained from the accessed data sources. Each test model can have predetermined predictive variables and each test model can be built from one or more of the plurality of disparate data sources. A final set of predictive variables can be determined by a variable selector and using at least one data processor, from the predetermined predictive variables in the plurality of test models by comparing the predictive power of the predictive variables across the plurality of test models. The final set of predictive variables can be the most predictive of the predetermined predictive variables. A master dataset can be generated generating using at least one data processor, the master dataset can comprise data selected from the disparate data sources and corresponding to the determined final set of predictive variables. A master model can be built using at least one data processor and from the master dataset. The master model can combine the final set of predictive variables from the plurality of disparate data sources. The master model can characterize a quantitative estimate of the probability that an entity will display a defined behavior.

One or more of the following features can be included in any feasible combination. For example, iterative building of test models and determining an interim set of predictive variables can occur until the test models or the interim set of predictive variables satisfy a predetermined criterion. At least one of the disparate data sources can be broken into multiple child datasets so each child dataset contains only a subset of the predictive variables and the child datasets share the same performance variable, sampling scheme, and segmentation scheme. Test models can be built for each child dataset. The disparate data source populations can be segmented into more homogenous sub-populations. Data can be merged across multiple disparate data sources and in one or more varying combinations of the disparate data sources. Automatic down sampling of one or more disparate data sources can occur when a number of records in the disparate data source exceed a predetermined value. The disparate data sources can include one or more of a credit and debit bureau database; financial institution database comprising records of financial transactions; personal data database regarding demographic, lifestyle and public records; social network database, and online usage database. The predictive variables can be predetermined using a consumer behavior framework and can include whether an individual has had one or more of: a marriage, family expansion, new job, additional income, a number of recent hard credit inquiries, and risk score. A compilation of user selected model performance metrics can be reported across all test models built in a user-defined format.

An automatic modeling farmer is described herein that provides an advanced computing system and related software that automatically develops and evaluates a large number of possible models in order to automatically create and identify optimal models or models that meet specific criteria. The automatic modeling farmer can implement three sub-processes including input or data preparation, modeling, and reporting.

Non-transitory computer program products (i.e., physically embodied computer program products) are also described that store instructions, which when executed one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, an automatic model farmer can include a streamlined modeling process described that enables faster completion of large-scaled model development tasks using big data and a large number of component models. The automatic model farmer improves modeling capability, speed, and efficiency using big data and adaptive modeling. The modeling process including model development, evaluation, tracking and validation can be done within a shortened time with less manual work required from modelers. Model run time efficiency can be increased by running composite scorecard models, which are not dependent, in parallel.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
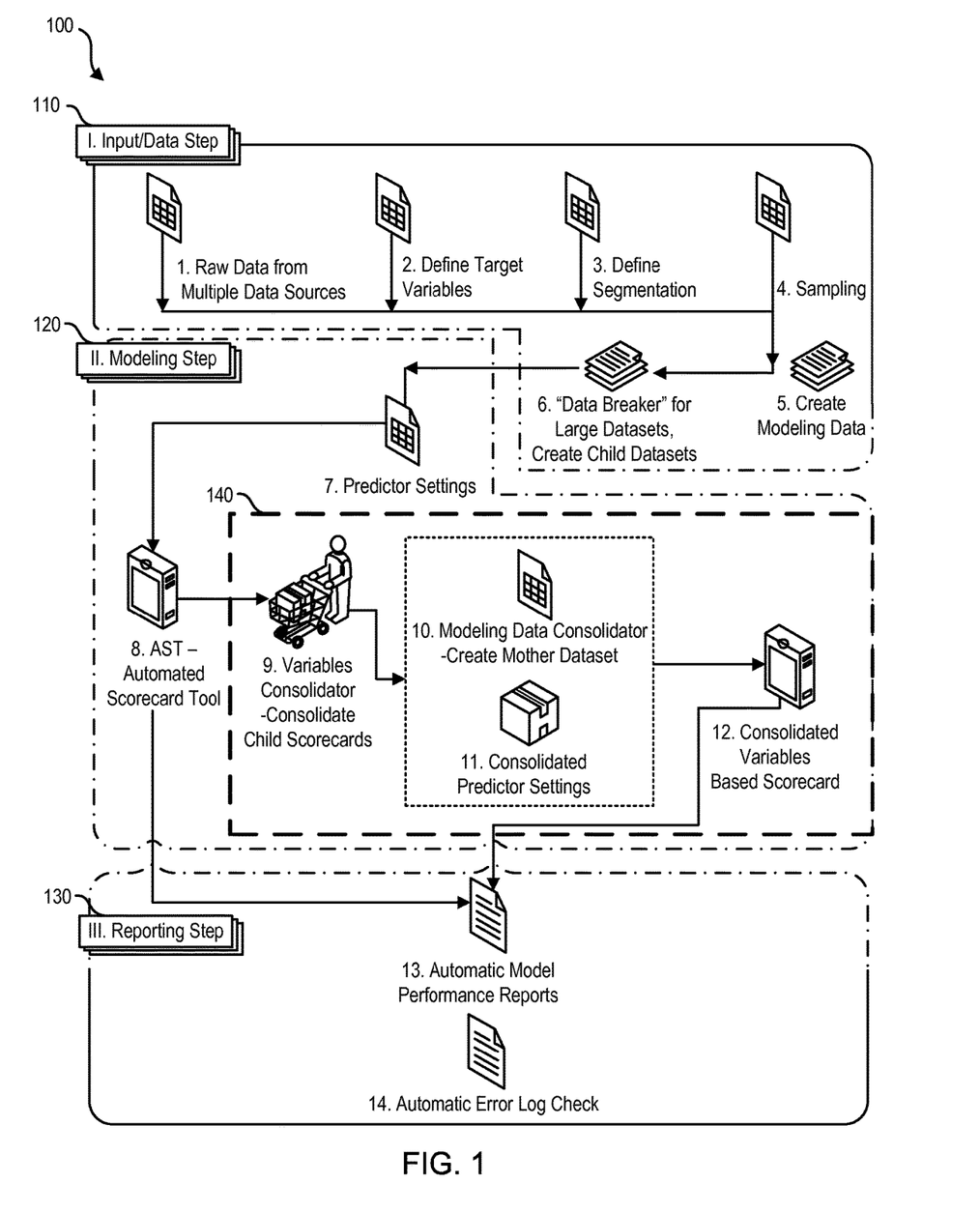
FIG. 1 is a process flow diagram illustrating processing steps of an Automatic Modeling Farmer (AMF)
Figure 2:
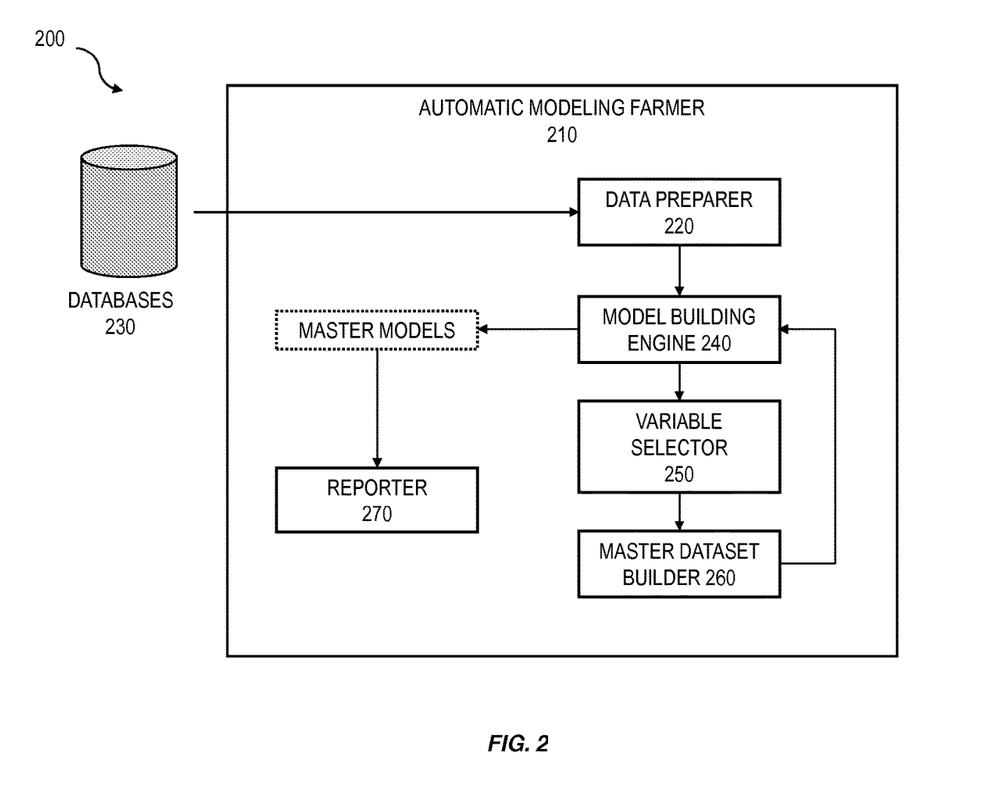
FIG. 2 is a system block diagram illustrating an AMF system for developing and evaluating a large number of possible models in order to automatically create and identify optimal models or models that meet specific criteria.

FIG. 1 is a process flow diagram 100 illustrating processing steps of an Automatic Modeling Farmer (AMF) and FIG. 2 is a system block diagram illustrating an AMF system 200 for developing and evaluating a large number of possible models in order to automatically create and identify optimal models or models that meet specific criteria. In some example implementations, the Automatic Modeling Farmer can be an environment or software package. In some implementations, the Automatic Modeling Farmer can implement three sub-processes including input or data preparation 110, modeling 120, and reporting 130, which can be performed by an AMF system 210.

The AMF system 210 can include a data preparer 220 to enable input or data preparation 110. The data preparer 220 can access disparate data sources from one or more databases or repositories 230. In some implementations, a user can prepare modeling data and provide necessary inputs for modeling activities. The Automatic Modeling Farmer 210 can allow a user to specify inputs. For example, a user can provide or select the location of input data sources 1, can define, code, or select one or more modeling performance variables or schemes 2, can specify one or more segmentation schemes 3, can provide a sample size and/or target sample 4, and can define intermediate and/or output dataset locations. It may be possible to input multiple alternative inputs (e.g., performance schemes and/or segmentation schemes) to result in multiple scorecard models, from which one or more preferred scorecard models can be selected or used.

Input data sources can include, for example, databases or repositories 230 containing information needed to build the models. Modeling performance variables can include, for example, variables identified as being important or predictive for the model. Segmentation schemes can include, for example, guidelines for segmenting the data source populations into more homogenous sub-populations prior to building models. Segmentation can be done for a variety of reasons, such as, interaction detection. It can be difficult to capture interactions directly through easily interpretable variables; by segmenting the population wisely, it is possible to have the segmentation capture the interactions correctly. Additionally, segmentation may be performed to focus on relevant variables. In some populations, certain variables become more relevant. Further, segmentation can be performed to improve palatability. Related to the interactions, it is possible for variables to have complicated predictive patterns on an overall population, but straightforward patterns on subpopulations. Segmentation can lead to the ability to put variables with palatability issues into models where interpretability is required.

In an example implementation, a model can be created to predict a consumer's odds of consuming new credit within a certain time. One example of such an model can be found in co-pending patent application entitled: "Predicting Consumer New Credit Consumption" filed on Aug. 26, 2014, and having Ser. No. 14/468,849, the contents of which are hereby fully incorporated by reference herein. The model can be used, for example, in a marketing context, such as a direct marketing campaign for credit cards. The data sources for building a model to enable the prediction can include, for example, credit and debit bureaus, financial institutions that include records of financial transactions, personal data regarding demographic, lifestyle and public records, as well as online data such as social networks, online usage, and the like. The predictive variables can be derived using a consumer behavior framework and can include whether an individual has had a marriage, family expansion, new job, additional income, a number of recent hard credit inquiries, risk score, and the like. Segmentation and sample size can be predetermined.

Data preparer 220 can receive the provided inputs and process the inputs into a form that is ready for model building activities. Data preparation 110 can include creating the modeling data 5 by merging data across multiple data sources and across various combinations of the different data sources. Automatic down sampling can be performed for datasets with large number of records (e.g., the number of records exceeds a predetermined value). The automatic sampling can be based on different modeling performance variable settings, and training/test flag creation.

Data preparer 220 can include a data breaker 6 that splits datasets with a large number of predictive or relevant variables into resultant datasets (child datasets) that contain only a subset of the predictive or relevant variables. Additionally, the size of the child dataset can be more suitable for fast modeling activities in subsequent steps. Child datasets can share the same performance variables, sampling scheme, and segmentation scheme so subsequent model results obtained using the child datasets can be combined.

During modeling 120, the prepared modeling data can be used in model building activities by a model builder engine 240. A predictor-setting file 7 can be established. The predictor-setting file 7 allows a user to establish a desired group of predictors to be considered in the modeling process. Each planned model has a corresponding predictor-setting file 7. The predictor-setting file 7 can optionally include a desired pattern direction on a predictor variable. For example, "Months Since Oldest Credit File Opened" can be a variable in a credit risk model. The pattern direction can be specified so that the variable has a monotonically increasing pattern (e.g., the longer the credit history, the better the credit risk). Pattern direction can ensure model interpretability and quality by embracing variable relationships and reduce over-fitting. Additionally, the optional pattern direction can enable models to meet regulatory requirements (e.g., in a financial credit score model or other similar model) and facilitate reason code assignments.

A model builder engine 240, such as an Automated Scorecard Tool 8, can automatically build or generate test models from the prepared data and predictor-settings 7. In some implementations, Automated Scorecard Tool 8 can automatically build a test model (also referred to herein as a scorecard) for a specific target variable, and can support multiple segments and segment alignment. Each test model can have predetermined predictive variables and each test model can be built from one or more of the disparate data sources. The Automated Scorecard Tool 8 can build and align segmented models for all input data and provide a final aligned model result.

An automatic model learner process 140 can be performed and can include variable aggregation 9, modeling data aggregation 10, predictor-setting aggregation 11, and iterative modeling 12. For models built with different data sources, variable selector 250 can perform a variable aggregation 9 to automatically conduct a comparison across test models. Variable selector 250 can select a final set of most predictive variables from the predictive variables in the test models built from the disparate data sources. A master dataset builder 260 can perform data aggregation 10 to generate or build a master dataset with a master list of the final set of predictive variables. The master list of variables that comprises the master dataset is the product of the compiled results from the variable selector 250, matching the most predictive variables from each disparate data source using a predetermined matchkey common to each data source. In some implementations, the master dataset retains only the necessary elements of the data sources for efficient computation. Additionally, through the creating of this master dataset, essential variables for segmentation and validation can be retained while also keeping the variables from each standalone data source that have shown the most predictive benefit.

Similarly, for data sources with large numbers of predictive variables (as mentioned in the data preparation step) the models built on the "child" datasets can be then combined to construct a "mother" dataset with the final set of predictive variables (e.g., the most predictive variables). A "mother" model can then be built for that data source. Predictor-settings can be aggregated and consolidated 11. Model builder engine 240, variable selector 250, and master data set builder 260 can perform iterative modeling 12 after the "mother" model is obtained so the most predictive variables from the "mother" dataset can be combined with the most predictive variables from other data sources into a master dataset. Iteration can occur to determine interim sets of predictive variables until the test models or the interim set of predictive variables satisfy a predetermined criterion. A master model can be built that combines the final set of predictive variables from the disparate data sources.

In a manner similar to the creation of each standalone model, the Automated Scorecard Tool 8 can run on the master dataset to identify the most predictive variables from the aggregated data sources. As with each disparate data source's model, the Automated Scorecard Tool 8 can build a scorecard for the specific target variables on which the disparate scorecards were built, supporting the same segments and segment alignment. The complete list of variables used in the disparate scorecards can comprise the list of candidate variables for the master model. Through this process, the variables identified in each disparate scorecard compete with variables from other disparate data sources. The master model can include one or more scorecards, as dictated by the segmentation scheme, which includes the most predictive variables from the master dataset.

The result of modeling 120 is a scorecard model for each individual combination of input performance scheme 2 and segmentation scheme 3. For example, if a user wanted to combine variables from 4 datasets to create a model, using three performance schemes and four segmentation schemes, the result is twelve master models (i.e., the number of performance schemes times the number of segmentation schemes).

Optionally, an automated model evolution function can be included that enables automatic variable selection within subsets of the predictive variable groups, combination of the most predictive variables from the first round model performance reports into a composite dataset, and creation of models on that composite dataset. The automated model evolution function provides the user with both stand-alone models and composite models for each desired performance variable.

Figure 3:
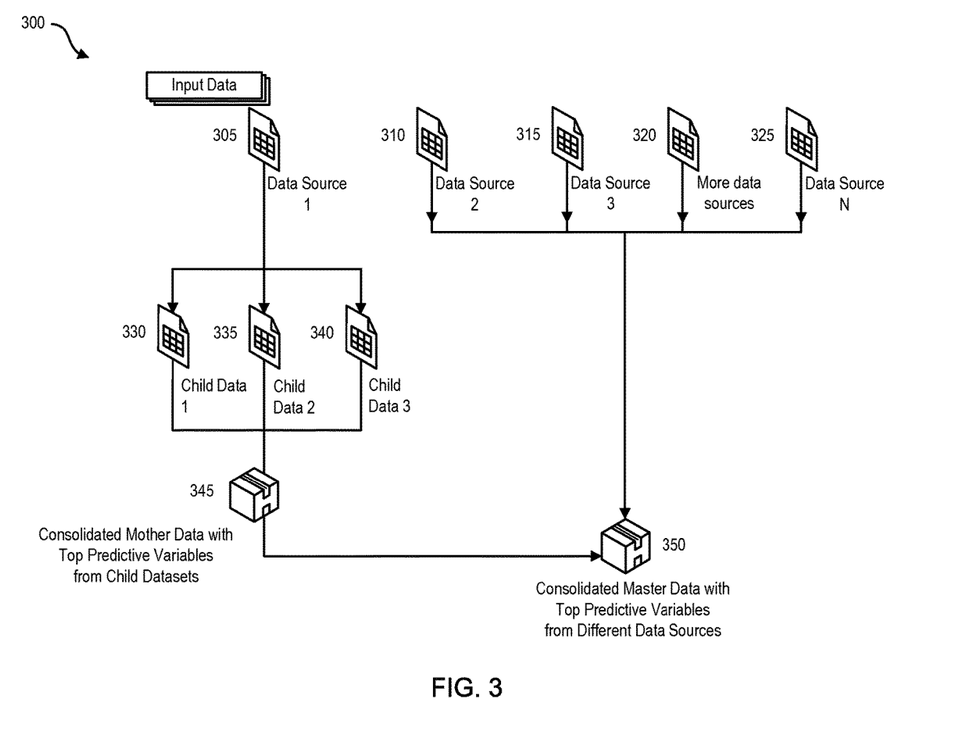
FIG. 3 is an illustration of the data flow in an example Automatic Modeling Learning process.

FIG. 3 is an illustration of the data flow 300 in an example implementation of an Automatic Modeling Learning process 140. N data sources (305, 310, 315, 320, and 325), illustrated in FIG. 3, are used to develop a consumer new credit consumption model or score (to predict a consumer's odds of consuming new credit within a certain time). Data source 1 305 contains over 1000 variables and thus is deemed large. The data breaker 6 splits dataset 1 305 into three child datasets 330, 335, and 340. Data sources 2 310 through N 325 have smaller datasets and so do not go through the data breaker 6. Three child models are then built using Automatic Scorecard Tool 8. The top predictive variables from the three child models are pulled from the first round modeling result to create a "mother" predictor-setting file and a "mother" dataset 345 comprising the predictor variables in the predictor-setting file 7. The iterative modeling process 11 builds the mother model from the mother dataset 345. The top predictive variables from the "mother" model for data source 1 305 is then combined with the top predictive variables from other data sources to form the final master dataset 350. A master model can be built on the master dataset 350 that combines the best predictive variables from all data sources.

The three child models 330, 335, and 340 can be built in parallel or in sequence; for example, when the variable types in the three child datasets 330, 335, and 340 are highly correlated. Thus, the variables in the second child dataset 335 can be selected if they are contributing additional value on top of the predictive information presented in the first child data 330. Variables selected from each child dataset can be compiled into the superset of variables (the "mother" dataset 345).

Reporter 270 implements reporting 130, which can include an automatic model performance report 13 and an automatic error log check 14. The automatic model performance report can compile all user selected model performance metrics across all models built in a user-defined format including benchmarking charts, and tables. By way of example, the reporting feature can include the following types of reports: a summary of statistics; charts of performance; key predictors and their contributions; correlations within predictor sets; score distributions; and score differences (compared to a benchmark score). Additional reports are possible.

Using the reporting features, a user can quickly assess and review the predictive value from each individual data source on each selected target variables. In contrast, a manual model performance review process, given the large number of models involved in big data modeling, would be labor intensive. The automatic error log check 14 is an error log scanner that checks for errors related phrases, such as "error," and "warning." The automatic error log check 14 can identify the source of the error (e.g., the script or function name and line number), and provide the information to a user. The specific error related phrases could be programming language specific.

To enable parallel processing, the automatic model farmer can include a farmer job launcher that lauches large numbers of modeling tasks through a parallel computing facility. The farmer launcher can improve efficieny and leverage big data computing capability by splitting a big modeling task into many pieces such that the smaller jobs can run in parallel.

The Automatic Model Farmer can apply to not only financial modeling, but also any applications that benefit from large scale modeling technologies.

Figure 4:
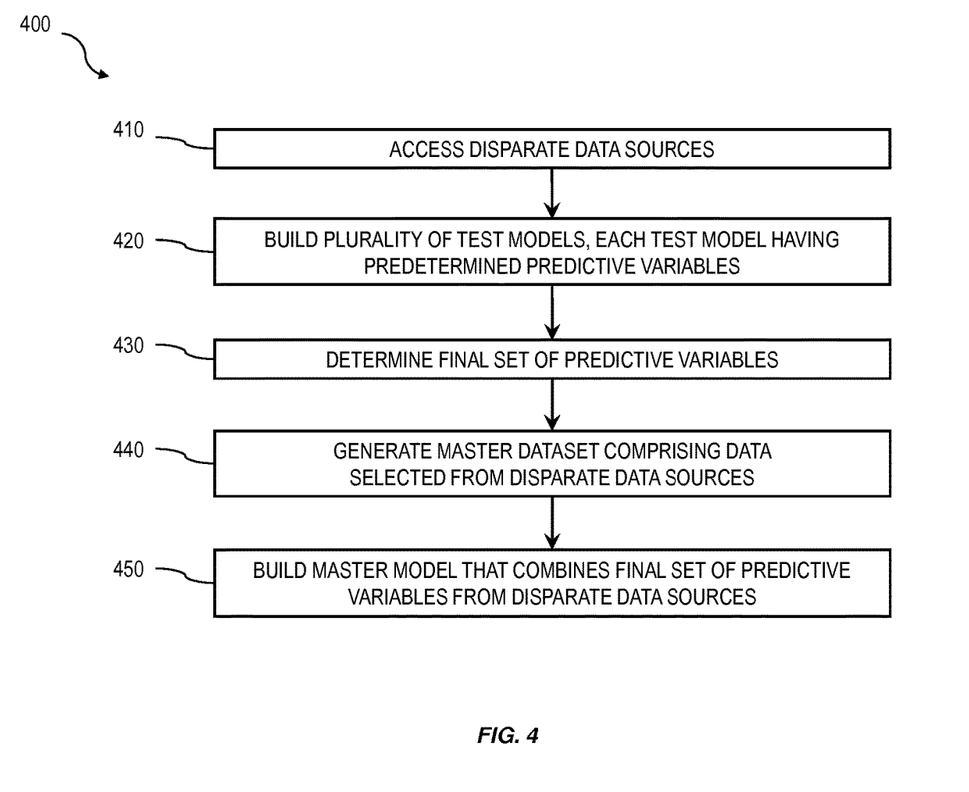
FIG. 4 is an example process flow diagram illustrating a process for developing and evaluating a large number of possible models in order to automatically create and identify optimal models or models that meet specific criteria.

FIG. 4 is an example process flow diagram illustrating a process 400 for developing and evaluating a large number of possible models in order to automatically create and identify optimal models or models that meet specific criteria. Disparate data sources can be accessed at 410. The disparate data sources can reside on one or more databases or within one or more data repositories.

Test models can be built at 420. Each test model can have a predetermined predictive variable and each test model can be built from one or more of the plurality of disparate data sources. The predictive variables can be predetermined using a consumer behavior framework to identify variables of interest. Interim predictive variables can be selected that are the most predictive across the data sources and/or across the test models. The test models and the interim predictive variables can be iterative built and determined until a stopping criterion is reached.

A final set of predictive variables can be determined at 430. The final set of predictive variables can selected from the data sources and/or test models by comparing the predictive power of the predictive variables across the data sources and/or test models and selecting the predictive variables have relatively the most predictive power. Child datasets created from the data sources can be used to build test models and the final set of predictive variables can include predictive variables selected from the child datasets and/or test models built using the child data sets.

A master dataset can be generated at 440. The master data set can comprise data selected from the disparate data sources that correspond to the determined final set of predictive variables. A master model can be built from the master dataset at 450. The master model can include a combination of the final set of predictive variables from the plurality of disparate data sources and/or test models.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
accessing, from at least one database, data from a plurality of disparate data sources;
automatically building, using the data obtained from the accessed data sources, a first test model and a second test model, the first test model and the second test model having predetermined predictive variables and the first test model and the second test model built from one or more of the plurality of disparate data sources;
determining a set of predictive variables from the predetermined predictive variables in the first test model and the second test model by comparing a predictive power of the predictive variables of the first test model and the second test model, the set of predictive variables being a subset of the predetermined predictive variables;
generating a dataset comprising data selected from the disparate data sources and corresponding to the determined set of predictive variables; and
building, from the dataset, a model that combines the set of predictive variables, the model characterizing a quantitative estimate of a probability that an entity will display a defined behavior.

2. The method of claim 1, further comprising iteratively building test models and determining an interim set of predictive variables until the test models or the interim set of predictive variables satisfy a predetermined criterion.

3. The method of claim 1, further comprising:
breaking at least one of the disparate data sources into multiple child datasets so each child dataset contains only a subset of the predictive variables and the child datasets share the same performance variable, sampling scheme, and segmentation scheme; and
building test models for each child dataset.

4. The method of claim 1, further comprising segmenting the disparate data source populations into more homogenous sub-populations.

5. The method of claim 1, further comprising merging data across multiple disparate data sources and in one or more varying combinations of the disparate data sources.

6. The method of claim 1, further comprising automatic down sampling of one or more disparate data sources in response to determining a number of records in the disparate data source exceeds a predetermined value.

7. The method of claim 1 wherein the disparate data sources include one or more of a credit and debit bureau database; financial institution database comprising records of financial transactions; personal data database regarding demographic, lifestyle and public records; social network database, and online usage database.

8. The method of claim 1, wherein the predictive variables are predetermined using a consumer behavior framework and include whether an individual has had one or more of: a marriage, family expansion, new job, additional income, a number of recent hard credit inquiries, and risk score.

9. The method of claim 1, further comprising reporting a compilation of user selected model performance metrics across all test models built in a user-defined format.

10. A system comprising at least one data processor, and memory storing instructions which, when executed by the at least one data processor, causes the at least one data processor to perform operations comprising:
accessing, from at least one database, data from a plurality of disparate data sources;
automatically building, using the data obtained from the accessed data sources, a first test model and a second test model, the first test model and the second test model having predetermined predictive variables and the first test model and the second test model built from one or more of the plurality of disparate data sources;
determining a set of predictive variables from the predetermined predictive variables in the first test model and the second test model by comparing a predictive power of the predictive variables of the first test model and the second test model, the set of predictive variables being a subset of the predetermined predictive variables;
generating a dataset comprising data selected from the disparate data sources and corresponding to the determined set of predictive variables; and
building, from the dataset, a model that combines the set of predictive variables, the model characterizing a quantitative estimate of a probability that an entity will display a defined behavior.

11. The system of claim 10, the operations further comprising iteratively building test models and determining an interim set of predictive variables until the test models or the interim set of predictive variables satisfy a predetermined criterion.

12. The system of claim 10, the operations further comprising:
breaking at least one of the disparate data sources into multiple child datasets so each child dataset contains only a subset of the predictive variables and the child datasets share the same performance variable, sampling scheme, and segmentation scheme; and
building test models for each child dataset.

13. The system of claim 10, the operations further comprising segmenting the disparate data source populations into more homogenous sub-populations.

14. The system of claim 10, the operations further comprising merging data across multiple disparate data sources and in one or more varying combinations of the disparate data sources.

15. A non-transitory computer program product storing instructions, which when executed by at least one data processor of at least one computing system, implement a method, the method comprising:

accessing, from at least one database, data from a plurality of disparate data sources;

automatically building, using the data obtained from the accessed data sources, a first test model and a second test model, the first test model and the second test model having predetermined predictive variables and the first test model and the second test model built from one or more of the plurality of disparate data sources;

determining a set of predictive variables from the predetermined predictive variables in the first test model and the second test model by comparing a predictive power of the predictive variables of the first test model and the second test model, the set of predictive variables being a subset of the predetermined predictive variables;

generating a dataset comprising data selected from the disparate data sources and corresponding to the determined set of predictive variables; and building, from the dataset, a model that combines the set of predictive variables, the model characterizing a quantitative estimate of a probability that an entity will display a defined behavior.

16. The computer program product of claim 15, the method further comprising iteratively building test models and determining an interim set of predictive variables until the test models or the interim set of predictive variables satisfy a predetermined criterion.

17. The computer program product of claim 15, the method further comprising:

breaking at least one of the disparate data sources into multiple child datasets so each child dataset contains only a subset of the predictive variables and the child datasets share the same performance variable, sampling scheme, and segmentation scheme; and building test models for each child dataset.

18. The computer program product of claim 15, the method further comprising segmenting the disparate data source populations into more homogenous sub-populations.

19. The computer program product of claim 15, the method further comprising merging data across multiple disparate data sources and in one or more varying combinations of the disparate data sources.

20. The computer program product of claim 15, the method further comprising automatic down sampling of one or more disparate data sources in response to determining that a number of records in the disparate data source exceeds a predetermined value.

* * * * *